United States Patent
Lian et al.

(10) Patent No.: US 10,168,773 B2
(45) Date of Patent: Jan. 1, 2019

(54) POSITION LOCATING METHOD AND APPARATUS

(71) Applicant: Huawei Technologies Co., Ltd., Shenzhen (CN)

(72) Inventors: Shiguo Lian, Shenzhen (CN); Jun Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 15/399,348

(22) Filed: Jan. 5, 2017

(65) Prior Publication Data

US 2017/0115732 A1    Apr. 27, 2017

Related U.S. Application Data

(63) Continuation of application No. PCT/CN2014/094728, filed on Dec. 23, 2014.

(30) Foreign Application Priority Data

Jul. 15, 2014   (CN) .......................... 2014 1 0337070

(51) Int. Cl.
*G09G 5/00*     (2006.01)
*G06F 3/033*    (2013.01)
(Continued)

(52) U.S. Cl.
CPC ............ *G06F 3/013* (2013.01); *G06F 3/0346* (2013.01); *G09G 5/38* (2013.01); *G06F 2203/0384* (2013.01)

(58) Field of Classification Search
CPC .............................................. G06F 17/30174
See application file for complete search history.

(56) References Cited

U.S. PATENT DOCUMENTS 6,204,828 B1    3/2001  Amir et al.
2003/0076299 A1  4/2003  Trajkovic
(Continued)

FOREIGN PATENT DOCUMENTS

CN    101344816 A    1/2009
CN    102693022 A    9/2012
(Continued)

OTHER PUBLICATIONS

Machine Translation and Abstract of Chinese Publication No. CN102830797, Dec. 19, 2012, 30 pages.
(Continued)

*Primary Examiner* — Nan-Ying Yang
(74) *Attorney, Agent, or Firm* — Conley Rose, P.C.

(57) ABSTRACT

A position locating method and apparatus are applied to the electronic information field, so that shifting an indication cursor in a wide range using a wireless indication device can be avoided, and a user operation can be simplified. The method comprises detecting a line-of-sight orientation of a user, and obtaining a line-of-sight orientation parameter of the user; detecting a line-of-sight source of the user, and obtaining a line-of-sight source position of the user; obtaining a position of a screen, and obtaining a screen position of a line of sight according to the line-of-sight orientation parameter, the position of the screen, and the line-of-sight source position; and receiving an adjustment signal, adjusting, according to the adjustment signal, the position displayed on the screen, and displaying an adjusted position on the screen.

12 Claims, 5 Drawing Sheets

(51) Int. Cl.
*G09G 5/08* (2006.01)
*G06F 3/01* (2006.01)
*G09G 5/38* (2006.01)
*G06F 3/0346* (2013.01)

(56) References Cited

U.S. PATENT DOCUMENTS

| | | | | |
|---|---|---|---|---|
| 2008/0019531 | A1* | 1/2008 | Kimijima | H04S 7/30 381/1 |
| 2009/0279842 | A1* | 11/2009 | Liao | H04N 5/772 386/239 |
| 2011/0282740 | A1* | 11/2011 | Ochi | G06F 1/3228 705/14.53 |
| 2013/0002551 | A1* | 1/2013 | Imoto | G06F 3/013 345/158 |
| 2013/0235347 | A1 | 9/2013 | Hennessey et al. | |
| 2014/0007020 | A1* | 1/2014 | Park | G06F 3/017 715/863 |

FOREIGN PATENT DOCUMENTS

| | | |
|---|---|---|
| CN | 102812416 A | 12/2012 |
| CN | 102830797 A | 12/2012 |
| CN | 103366381 A | 10/2013 |

OTHER PUBLICATIONS

Machine Translation and Abstract of Chinese Publication No. CN103366381, Oct. 23, 2013, 15 pages.
Foreign Communication From a Counterpart Application, Chinese Application No. 201410337070.6, Chinese Office Action dated Sep. 4, 2017, 6 pages.
Machine Translation and Abstract of Chinese Publication No. CN101344816, Jan. 14, 2009, 9 pages.
Foreign Communication From a Counterpart Application, PCT Application No. PCT/CN2014/094728, English Translation of International Search Report dated Mar. 27, 2015, 2 pages.
Foreign Communication From a Counterpart Application, PCT Application No. PCT/CN2014/094728, English Translation of Written Opinion dated Mar. 27, 2015, 5 pages.

* cited by examiner

POSITION LOCATING METHOD AND APPARATUS

CROSS-REFERENCE TO RELATED APPLICATIONS

This application is a continuation of International Application No. PCT/CN2014/094728, filed on Dec. 23, 2014, which claims priority to Chinese Patent Application No. 201410337070.6, filed on Jul. 15, 2014, both of which are hereby incorporated by reference in their entireties.

TECHNICAL FIELD

The present disclosure relates to the electronic information field, and in particular, to a position locating method and apparatus.

BACKGROUND

During a presentation or an explanation, an image can be magnified on a relatively large screen, so that more audiences can clearly watch content on the screen. In addition, a detail can be magnified on the relatively large screen, so as to help a speaker give an explanation. In this way, on a growing quantity of occasions, a speaker makes a presentation using a large screen. The large screen may be a screen made from polycarbonate (PC), or may be a wall.

In a process of giving an explanation using a large screen, a user usually needs to perform a pointing operation on an image on the screen, to give an explanation for content on the image. In existing technical solutions, the user performs an operation using a wireless virtual indication device (for example, a wireless air mouse or a touchscreen indication device), transfers a signal to the large screen using the wireless virtual indication device, and controls a position of an indication cursor on the large screen. For example, the user gives an "upward" indication to the wireless virtual indication device (for the wireless air mouse, the user may press a "move up" button; for the touchscreen indication device, the user may slide a distance upward with a finger), and the position of the indication cursor on the large screen moves upward for a corresponding distance. In this way, the user performs pointing operations in various directions using the wireless virtual indication device, so that the indication cursor can point to a position required by the user.

During implementation of the foregoing position locating process, in the prior art, the position required by the speaker on the screen is located using the wireless virtual indication device. However, due to large-screen popularization, a case in which there is a relatively long distance between two adjacent indication positions often occurs during a presentation. If the indication cursor is still shifted in a wide range using the wireless virtual indication device, the user needs to take much effort and time to perform an operation, which brings inconvenience when the user gives an explanation.

SUMMARY

Embodiments of the present disclosure provide a position locating method and apparatus, so as to avoid shifting an indication cursor in a wide range using a wireless indication device, and simplify a user operation.

To achieve the foregoing objective, the following technical solutions are used in the embodiments of the present disclosure.

According to a first aspect, a position locating method is provided, including detecting a line-of-sight orientation of a user, and obtaining a line-of-sight orientation parameter of the user; detecting a line-of-sight source of the user, and obtaining a line-of-sight source position of the user; obtaining a position of a screen, and obtaining a screen position of a line of sight according to the line-of-sight orientation parameter, the position of the screen, and the line-of-sight source position; displaying, on the screen, the screen position of the line of sight; and receiving an adjustment signal, adjusting, according to the adjustment signal, the position displayed on the screen, and displaying an adjusted position on the screen.

With reference to the first aspect, in a first possible implementation manner, the method further includes, when receiving the adjustment signal, obtaining an indication signal, and determining, according to the indication signal, whether to update the screen position of the line of sight; and if the screen position of the line of sight is to be updated, displaying, on the screen, an updated screen position of the line of sight; or if the screen position of the line of sight is not to be updated, adjusting the position on the screen according to the adjustment signal.

With reference to the first possible implementation manner of the first aspect, in a second possible implementation manner, the obtaining an indication signal, and determining, according to the indication signal, whether to update the screen position of the line of sight includes obtaining a time between a moment of receiving the adjustment signal and a moment of receiving a previous adjustment signal; and determining whether the time exceeds a preset time, and if the time exceeds the preset time, updating the screen position of the line of sight.

With reference to the first possible implementation manner of the first aspect, in a third possible implementation manner, the obtaining an indication signal, and determining, according to the indication signal, whether to update the screen position of the line of sight includes receiving an audio signal; and determining whether the audio signal is consistent with to-be-triggered sound, and if the audio signal is consistent with the to-be-triggered sound, updating the screen position of the line of sight.

With reference to the first possible implementation manner of the first aspect, in a fourth possible implementation manner, the obtaining an indication signal, and determining, according to the indication signal, whether to update the screen position of the line of sight includes receiving an action signal; and determining whether the action signal is consistent with a to-be-triggered action, and if the action signal is consistent with the to-be-triggered action, updating the screen position of the line of sight.

With reference to any one of the first aspect or possible implementation manners of the first aspect, in a fifth possible implementation manner, the receiving an adjustment signal, and adjusting, according to the adjustment signal, the position displayed on the screen includes receiving an adjustment signal sent using a wireless indication device, and adjusting, according to the adjustment signal sent using the wireless indication device, the position displayed on the screen, where the adjustment signal sent using the wireless indication device is used to indicate a movement direction and a movement distance; or receiving the adjustment signal, detecting an offset obtained according to a wrist position and a finger deviation angle of the user, and adjusting, according to the offset, the position displayed on the screen.

According to a second aspect, a position locating apparatus is provided, including a detection unit configured to detect a line-of-sight orientation of a user, and obtain a line-of-sight orientation parameter of the user, where the detection unit is further configured to detect a line-of-sight source of the user, and obtain a line-of-sight source position of the user; a locating unit configured to obtain a position of a screen, and obtain a screen position of a line of sight according to the line-of-sight orientation parameter obtained by the detection unit, the position of the screen, and the line-of-sight source position obtained by the detection unit; a display unit configured to display, on the screen, the screen position of the line of sight; and an adjustment unit configured to receive an adjustment signal, adjust, according to the adjustment signal, the position displayed on the screen, and display an adjusted position on the screen.

With reference to the second aspect, in a first possible implementation manner, the apparatus further includes a determining unit configured to, when the adjustment unit receives the adjustment signal, obtain an indication signal, and determine, according to the indication signal, whether to update the screen position of the line of sight; and the display unit is further configured to, if the screen position of the line of sight is to be updated, display, on the screen, an updated screen position of the line of sight; or the adjustment unit is further configured to, if the screen position of the line of sight is not to be updated, adjust the position on the screen according to the adjustment signal.

With reference to the first possible implementation manner of the second aspect, in a second possible implementation manner, the determining unit includes an obtaining subunit configured to obtain a time between a moment of receiving the adjustment signal and a moment of receiving a previous adjustment signal; and a determining subunit configured to determine whether the time exceeds a preset time, and if the time exceeds the preset time, update the screen position of the line of sight.

With reference to the first possible implementation manner of the second aspect, in a third possible implementation manner, the determining unit includes an obtaining subunit configured to receive an audio signal; and a determining subunit configured to determine whether the audio signal is consistent with to-be-triggered sound, and if the audio signal is consistent with the to-be-triggered sound, update the screen position of the line of sight.

With reference to the first possible implementation manner of the second aspect, in a fourth possible implementation manner, the determining unit includes an obtaining subunit configured to receive an action signal; and a determining subunit configured to determine whether the action signal is consistent with a to-be-triggered action, and if the action signal is consistent with the to-be-triggered action, update the screen position of the line of sight.

With reference to any one of the second aspect or possible implementation manners of the second aspect, in a fifth possible implementation manner, the adjustment unit is configured to receive an adjustment signal sent using a wireless indication device, and adjust, according to the adjustment signal sent using the wireless indication device, the position displayed on the screen, where the adjustment signal sent using the wireless indication device is used to indicate a movement direction and a movement distance; or receive the adjustment signal, detect an offset obtained according to a wrist position and a finger deviation angle of the user, and adjust, according to the offset, the position displayed on the screen.

In the foregoing solutions, a line-of-sight orientation parameter of a user is obtained, a line-of-sight source position of the user is obtained, and a position of a screen is obtained; a screen position of a line of sight is obtained according to the line-of-sight orientation parameter, the position of the screen, and the line-of-sight source position; the screen position of the line of sight is displayed on the screen; and an adjustment signal is received, the position displayed on the screen is adjusted according to the adjustment signal, and an adjusted position is displayed on the screen. In this way, the user can complete locating only by adjusting the position displayed on the screen, which simplifies a user operation and improves position locating efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure are applied to a scenario in which a user points to a position required by the user on a screen, and the scenario includes the screen and the user. The user may position, using a virtual indication device or in another manner, the position required by the user on the screen. Generally, a position indicated by the user on the screen is displayed in a manner of a cursor. The cursor displayed on the screen is referred to as an indication cursor, and the indication cursor can help the user give an explanation or a presentation for an image on the screen.

Figure 1:
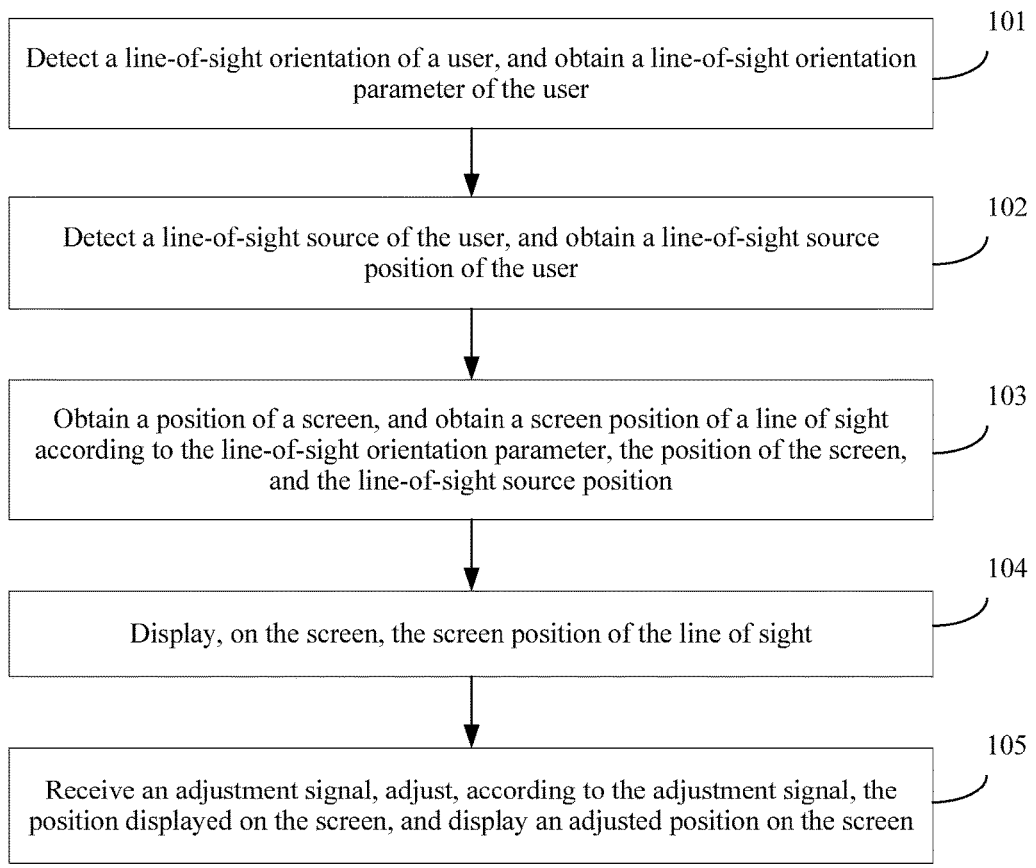
FIG. 1 is a schematic flowchart of a position locating method according to an embodiment of the present disclosure.

An embodiment of the present disclosure provides a position locating method. As shown in FIG. 1, the method includes the following steps.

S101. Detect a line-of-sight orientation of a user, and obtain a line-of-sight orientation parameter of the user.

Figure 2:
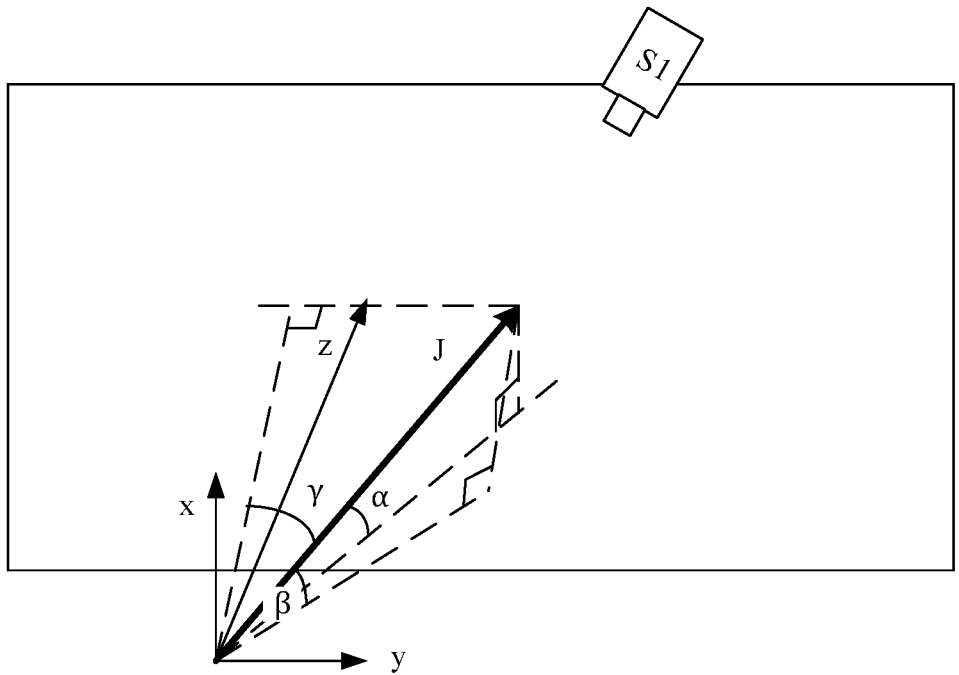
FIG. 2 is a schematic diagram of a line-of-sight direction of a user according to an embodiment of the present disclosure.

A line of sight orientation parameter of the user may be detected using a line of sightsensor S1 mounted above a screen. Optionally, the line of sightorientation parameter of the user includes an angle between a line-of-sight direction and a horizontal plane, an angle between the line-of-sight direction and a side plane, and an angle between the line-of-sight direction and a vertical plane. As shown in FIG. 2, a first coordinate system is established in space using a vertical direction as an X axis, a horizontal direction as a Y axis, and a front-to-rear direction as a Z axis, and the line-of-sight orientation is considered as a ray J. To obtain a direction of the ray J, an angle $\alpha$ between the ray J and a horizontal plane (a plane formed by the Y axis and the Z axis), an angle $\beta$ between the ray J and a side plane (a plane formed by the X axis and the Z axis), and an angle $\gamma$ between the ray J and a vertical plane (a plane formed by the X axis and the Y axis) need to be obtained.

Figure 3:
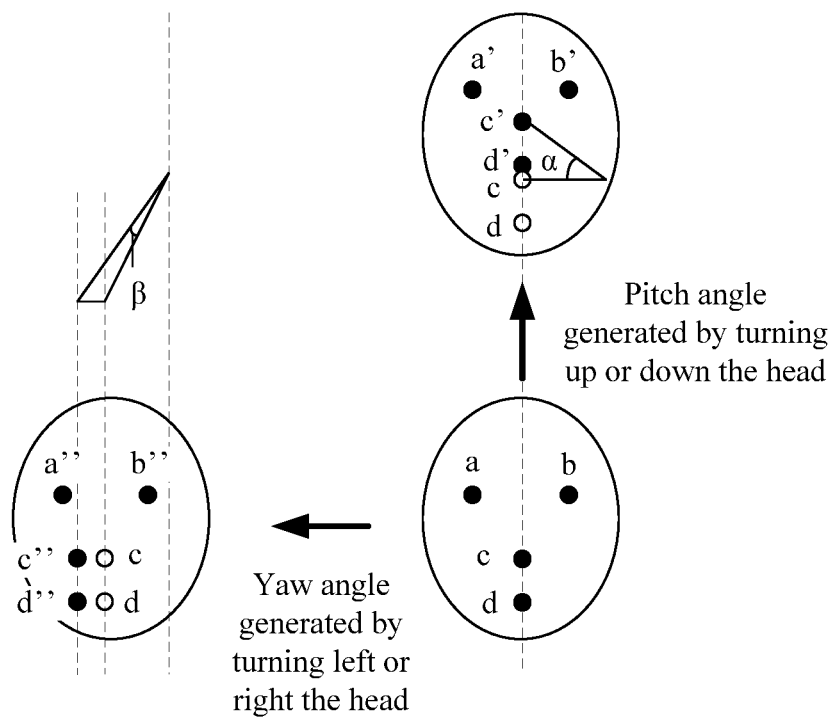
FIG. 3 is a schematic diagram of a method for detecting a line-of-sight orientation of a user according to an embodiment of the present disclosure.

As shown in FIG. 3, a second coordinate system (the coordinate system includes an X axis and a Y axis) may be established using a depth camera method, a multiple-camera face recognition method, or an orientation locating method based on a head identifier, and coordinates of eyes, a nose, and a mouth of a person are obtained in the second coordinate system. It is assumed herein that in a case in which the head of the person does not move in direction, coordinates of a left eye a are (ax, ay), coordinates of a right eye b are (bx, by), coordinates of the nose c are (cx, cy), and coordinates of the mouth d are (dx, dy).

In the first coordinate system, the angle $\alpha$ between the ray J and the horizontal plane is a pitch angle of the person, that is, an angle formed by raising or bowing the head of the person. Assuming that after a position of the head of the person changes, in the second coordinate system, coordinates of the left eye a' are (ax', ay'), coordinates of the right eye b' are (bx', by'), coordinates of the nose c' are (cx', cy'), and coordinates of the mouth d' are (dx', dy'), the angle $\alpha$ in the first coordinate system is calculated using the coordinates in the second coordinate system, and a calculation formula is as follows:

$$\alpha=2 \arcsin((cy'-cy)/2)/(H/2))\text{ or}$$

$$\alpha=2 \arcsin((dy'-dy)/2)/(H/2)),\text{ where}$$

H is a length of the head of the person. Certainly, although the coordinates of the eyes of the person are not used in angle calculation, the coordinates of the eyes of the person may be used as reference coordinates to determine the coordinates of the nose and that of the mouth. Because features of the eyes are easier to extract, the coordinates of the eyes are obtained first, and the coordinates of the nose and the mouth that are further obtained using a relative position relationship between the eyes and the nose and the mouth are more accurate.

Further, in the first coordinate system, the angle $\beta$ between the ray J and the side plane is a yaw angle of the person, that is, an angle formed by turning left or right a neck by the person. Assuming that after a position of the head of the person changes, in the second coordinate system, coordinates of the left eye a" are (ax", ay"), coordinates of the right eye b" are (bx", by"), coordinates of the nose c" are (cx", cy"), and coordinates of the mouth d" are (dx", dy"), the angle $\beta$ in the first coordinate system is calculated using the coordinates in the second coordinate system, and a calculation formula is as follows:

$$\beta=2 \arcsin((cx''-cx)/2)/(R/2))\text{ or}$$

$$\beta=2 \arcsin((dx''-dx)/2)/(R/2))$$

where R is a width of the head of the person. Certainly, although the coordinates of the eyes of the person are not used in angle calculation, the coordinates of the eyes of the person may be used as reference coordinates to determine the coordinates of the nose and that of the mouth. Because features of the eyes are easier to extract, the coordinates of the eyes are obtained first, and the coordinates of the nose and the mouth that are further obtained using a relative position relationship between the eyes and the nose and the mouth are more accurate.

Further, $\gamma=90°-\beta$, so that the direction of the ray J is obtained, that is, the line-of-sight orientation parameter of the user.

S102. Detect a line-of-sight source of the user, and obtain a line-of-sight source position of the user.

After the line-of-sight orientation parameter is obtained, the line-of-sight source position further needs to be located. Similar to a method for locating the eyes, the nose, and the mouth of the person in step 101, locating may be performed using the depth camera method, the multiple-camera face method, or the orientation locating method based on a head identifier, and coordinates of the eyes of the person in a third coordinate system (including an X axis, a Y axis, and a Z axis) are obtained. Assuming that obtained coordinates of the left eye a are (ax, ay, az), and obtained coordinates of the right eye b are (bx, by, bz), coordinates of the line-of-sight source are (ax+bx/2, ay+by/2, az+bz/2). Assuming that $x_0=ax+bx/2, y_0=ay+by/2, z_0=az+bz/2$, the coordinates of the line-of-sight source are $(x_0, y_0, z_0)$.

S103. Obtain a position of a screen, and obtain a screen position of a line of sight according to the line-of-sight orientation parameter, the position of the screen, and the line-of-sight source position.

A coordinate system is established, and a coordinate plane of the position of the screen, a coordinate point of the line-of-sight source position, and an angle of the line-of-sight orientation are obtained.

Figure 4:
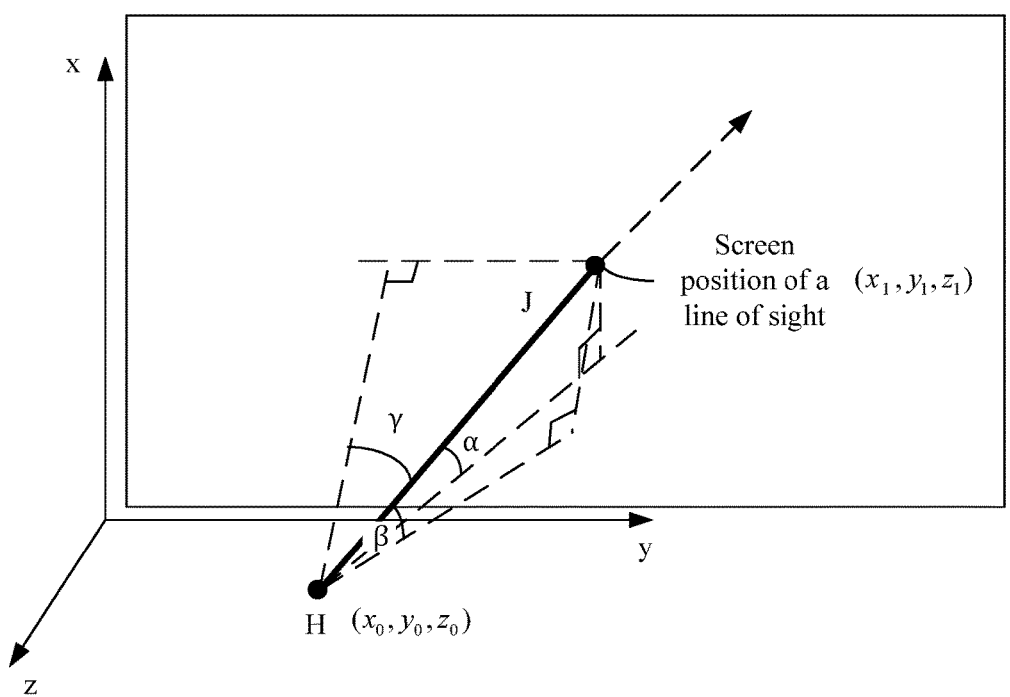
FIG. 4 is a schematic diagram of a method for calculating a screen position of a line of sight according to an embodiment of the present disclosure.

As shown in FIG. 4, the third coordinate system described in step 102 is established, and the screen is a plane formed by the X axis and the Y axis. Assuming that the coordinate point of the line-of-sight source position is H $(x_0, y_0, z_0)$, and the line-of-sight orientation parameter is the direction of the ray J, a position at which the line of sight of the user falls on the screen can be obtained by means of calculation.

The coordinate point of the line-of-sight source position is used as a start point, and in a direction of the line-of- (for example, the ray J), coordinates of a position at which the line-of-sight source is mapped on the coordinate plane of the position of the screen are obtained by means of calculation.

Assuming that coordinates of the screen position of the line of sight are $(x_1, y_1, z_1)$, and $z_1=0$ (the screen is the plane formed by the X axis and the Y axis), calculation formulas for $x_1$ and $y_1$ are as follows:

$$x_1=x_0+z_0\cdot\tan\alpha;\text{ and}$$

$$y_1=y_0+z_0\cdot\tan\beta.$$

S104. Display, on the screen, the screen position of the line of sight.

The screen may be a large screen used for indicating by the user, or may be another screen that is convenient for viewing by the user.

S105. Receive an adjustment signal, adjust, according to the adjustment signal, the position displayed on the screen, and display an adjusted position on the screen.

After the user views the screen position, displayed on the screen, of the line of sight, because the screen position of the line of sight is a position to which the line of sight points, a deviation may exist between the screen position of the line of sight and a position to which the user wants to point, and the user needs to perform adjustment.

Optionally, that the adjustment signal sent by the user is received includes at least one of following manners.

In one manner, an adjustment signal sent using a wireless indication device is received, and the position displayed on the screen is adjusted according to the adjustment signal sent using the wireless indication device, where the adjustment signal sent using the wireless indication device is used to indicate a movement direction and a movement distance.

A manner of receiving the adjustment signal sent by the user using the wireless indication device is as follows: receiving a position adjustment signal sent by the user using a wireless air mouse, where the position adjustment signal sent using the wireless air mouse is sent by the user by operating a direction key, and a position locating device may receive, using a wireless signal receiver, the position adjustment signal sent using the wireless air mouse, accordingly adjust the screen position of the line of sight, and display a position indicated by the user on the screen; or receiving a position adjustment signal sent by the user using a touchscreen indication device, where the position adjustment signal sent using the touchscreen indication device is sent by the user by sliding a corresponding distance in a corresponding direction on a touchscreen, and a position locating device may receive, using a wireless signal receiver, the position adjustment signal sent using the touchscreen indication device, accordingly adjust the screen position of the line of sight, and display a position indicated by the user on the screen; or receiving a position adjustment signal sent by the user using a three dimensional (3D) handle/mouse, where the position adjustment signal sent using the 3D handle/mouse is detected by a built-in sensor of a handle/mouse device or an external detection device when the user moves or rotates the handle/mouse device, for example, a movement distance and a rotation angle; and a position locating device may receive, using a wireless signal receiver, the position adjustment signal sent using the 3D handle/mouse, accordingly adjust the screen position of the line of sight, and display a position indicated by the user on the screen.

In another manner, the adjustment signal is received, an offset obtained according to a wrist position and a finger deviation angle of the user is detected, and the position displayed on the screen is adjusted according to the offset.

The offset, on the screen, of the screen position of the line of sight is obtained by detecting the finger deviation angle of the user. For example, a fourth coordinate system is established, and the screen is a plane formed by an X axis and a Y axis. Finger coordinates and wrist coordinates $(x_s, y_s, z_s)$ of the user are located using a camera (which is not limited to the camera herein, and methods such as target detection based on ultrasound, target detection based on an electric field, or electromyographic signal detection based on a wearable armband may be used) method. A first pointing direction (including an angle $\alpha_1$ between the pointing direction and a horizontal plane, an angle $\beta_1$ between the pointing direction and a side plane, and an angle $\gamma_1$ between the pointing direction and a vertical plane) is calculated according to a line between the finger coordinates and the wrist coordinates. When a finger of the person deflects, the coordinates of the finger are located again; a second pointing direction (including an angle $\beta_2$ between the pointing direction and the horizontal plane, an angle $\beta_2$ between the pointing direction and the side plane, and an angle $\gamma_2$ between the pointing direction and the vertical plane) is calculated according to a line between new finger coordinates and the wrist coordinates; an angle difference ($\alpha_2-\alpha_1$, $\beta_2-\beta_1$, $\gamma_2-\gamma_1$) between the two directions is obtained; and displacement, in a horizontal direction and a vertical direction, of the screen position of the line of sight is calculated, and formulas are as follows:

$$dx = x_s + z_s \cdot \tan(\alpha_2 - \alpha_1); \text{ and}$$

$$dy = y_s + z_s \cdot \tan(\beta_2 - \beta_1 - \beta_1),$$

where dx is displacement, in the horizontal direction on the screen, of the screen position of the line of sight, and dy is displacement, in the vertical direction on the screen, of the screen position of the line of sight. A position indicated by the user is obtained by displacing the screen position of the line of sight, and the position indicated by the user is displayed on the screen. Optionally, if the angle difference ($\beta_2-\alpha_1$, $\beta_2-\beta_1$, $\gamma_2-\gamma_1$) between the two directions exceeds a preset deflection angle, a current user operation may be invalidated, and the second pointing direction is obtained again.

Any solution in which the position adjustment signal of the user is detected using a wireless device or a camera (for example, a common RGB (which has pixels of three primary colors: red, green, and blue RGB for short) camera, a depth camera, or a 3D camera) and the screen position of the line of sight is accordingly adjusted falls within the protection scope of the embodiments of the present disclosure.

In the foregoing solutions, a line-of-sight orientation parameter of a user is obtained, a line-of-sight source position of the user is obtained, and a position of a screen is obtained; a screen position of a line of sight is obtained according to the line-of-sight orientation parameter, the position of the screen, and the line-of-sight source position; the screen position of the line of sight is displayed on the screen; and an adjustment signal is received, the position displayed on the screen is adjusted according to the adjustment signal, and an adjusted position is displayed on the screen. In this way, the user can complete locating only by adjusting the position displayed on the screen, which simplifies a user operation and improves position locating efficiency.

Figure 5:
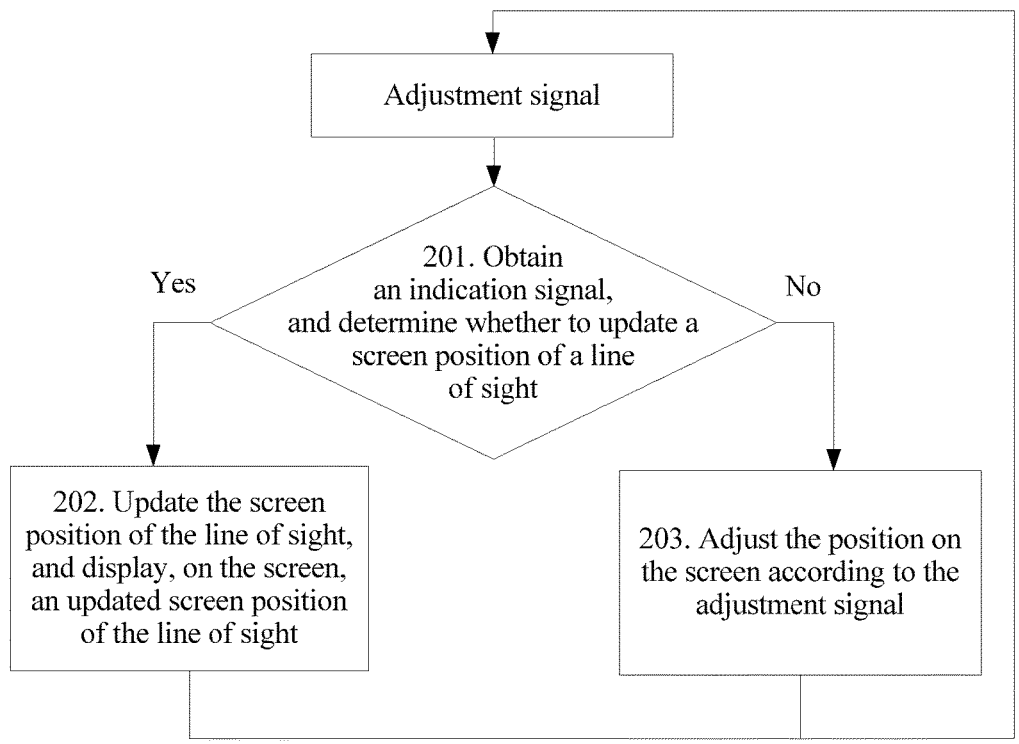
FIG. 5 is a schematic flowchart of a position locating method according to an embodiment of the present disclosure.

An embodiment of the present disclosure provides a position locating method. As shown in FIG. 5, if the user has already pointed to the screen once, when the user needs to perform position locating again, the method includes following steps.

S201. When receiving the adjustment signal, obtain an indication signal, and determine, according to the indication signal, whether to update the screen position of the line of sight.

Receiving the adjustment signal is described in step 105, and details are not described herein again. The obtaining an indication signal, and determining, according to the indication signal, whether to update the screen position of the line of sight includes obtaining a time between a moment of receiving the adjustment signal and a moment of receiving a previous adjustment signal; and determining whether the time exceeds a preset time, and if the time exceeds the preset time, updating the screen position of the line of sight, where generally, when a time between a current moment and a moment of obtaining a previous indication position exceeds a preset time, the user proceeds to an explanation on a next topic; in this case, a large quantity of operations may be caused if the user adjusts the original indication position, and therefore the screen position of the line of sight is obtained again according to a current line-of-sight source and line-of-sight direction of the user; or receiving an audio signal; and determining whether the audio signal is consistent with to-be-triggered sound, and if the audio signal is consistent with the to-be-triggered sound, updating the screen position of the line of sight, where for example, the to-be-triggered sound is "a next place", and if a sound control device receives a voice that includes "a next place" and is sent by the user, the screen position of the line of sight is obtained again according to a current line-of-sight source and line-of-sight direction of the user; or receiving an action signal; and determining whether the action signal is consistent with a to-be-triggered action, and if the action signal is consistent with the to-be-triggered action, updating the screen position of the line of sight, where for example, the to-be-triggered action is that "an angle by which a finger direction of the user rotates exceeds a preset angle", the angle by which the finger direction of the user rotates may be detected using the depth camera, and if the rotation angle exceeds the preset angle, the screen position of the line of sight is obtained again according to a current line-of-sight source and line-of-sight direction of the user.

S202. If the screen position of the line of sight is to be updated, display, on the screen, an updated screen position of the line of sight.

A method for updating the screen position of the line of sight is described in step 101 to step 103, and details are not described herein again.

S203. If the screen position of the line of sight is not to be updated, adjust the position on the screen according to the adjustment signal.

After step 203 is performed, step 201 is performed for another time.

In the foregoing embodiment, when an adjustment signal is received, an indication signal is obtained to determine whether to update a screen position of a line of sight. In this way, when a position on a screen shifts in a relatively wide range, a new screen position of the line of sight is obtained using the line of sight of the user, which simplifies a user operation and improves position locating efficiency.

Figure 6:
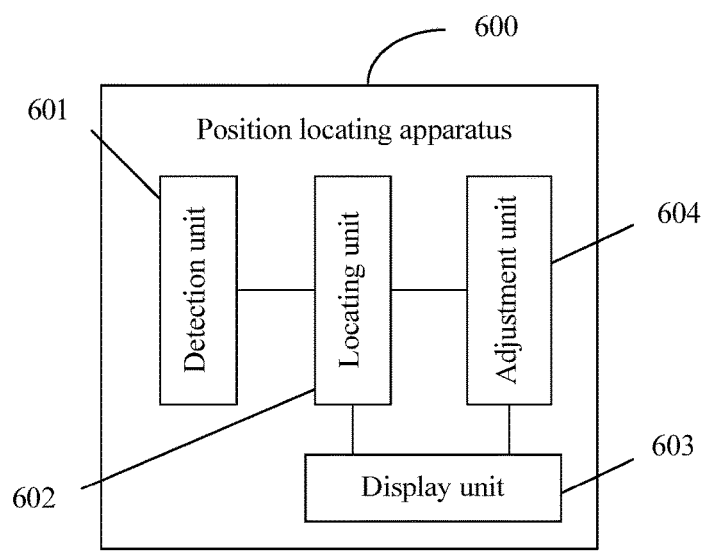
FIG. 6 is a schematic structural diagram of a position locating apparatus according to an embodiment of the present disclosure.
Figure 7:
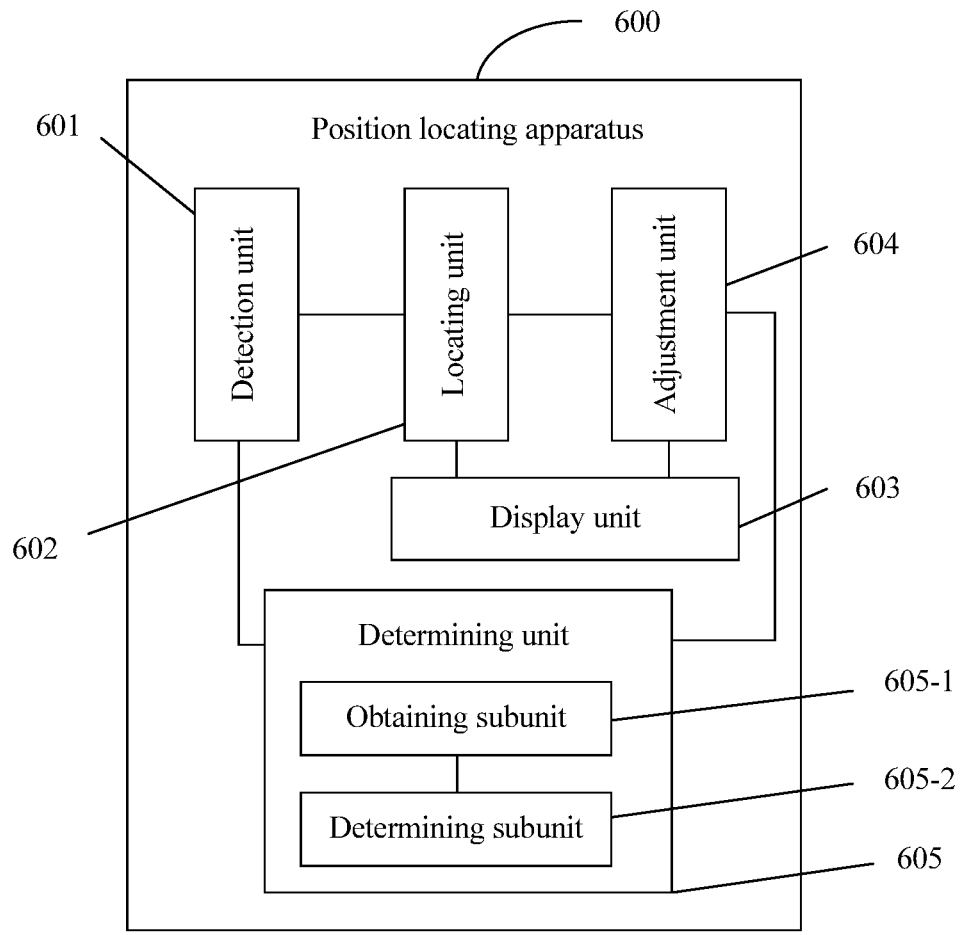
FIG. 7 is a schematic structural diagram of a position locating apparatus according to another embodiment of the present disclosure.

An embodiment of the present disclosure provides a position locating apparatus 600 configured to receive an indication sent by a user, and display a corresponding position on a screen. As shown in FIG. 6, the apparatus 600 includes a detection unit 601, a locating unit 602, a display unit 603, and an adjustment unit 604.

The detection unit 601 is configured to detect a line of sight of a user, and obtain a line-of-sight orientation parameter of the user.

The detection unit may detect a line of sight of the user using a line of sightsensor, and analyze an orientation of the line of sight, to obtain the corresponding line of sightorientation parameter, which is described in detail in step 101. Details are not described herein again.

The detection unit 601 is further configured to detect a line-of-sight source of the user, and obtain a line-of-sight source position of the user.

After the line-of-sight orientation parameter is obtained, the line-of-sight source position further needs to be located. Locating may be performed using a depth camera method, a multiple-camera face method, or an orientation locating method based on a head identifier. For example, eyes of a person are located using a face picture photographed by a depth camera, to determine the line-of-sight source position.

The locating unit 602 is configured to obtain a position of a screen, and obtain a screen position of a line of sight according to the line-of-sight orientation parameter obtained by the detection unit, the position of the screen, and the line-of-sight source position obtained by the detection unit.

A method for obtaining the screen position of the line of sight is described in step 103, and details are not described herein again.

The display unit 603 is configured to display, on the screen, the screen position of the line of sight.

The adjustment unit 604 is configured to receive an adjustment signal, adjust, according to the adjustment signal, the position displayed on the screen, and display an adjusted position on the screen.

After the user views the screen position, displayed on the screen, of the line of sight, because the screen position of the line of sight is a position to which the line of sight points, a deviation may exist between the screen position of the line of sight and a position to which the user wants to point, and the user needs to perform adjustment.

In one manner, an adjustment signal sent using a wireless indication device is received, and the position displayed on the screen is adjusted according to the adjustment signal sent using the wireless indication device, where the adjustment signal sent using the wireless indication device is used to indicate a movement direction and a movement distance.

A manner of receiving the adjustment signal sent by the user using the wireless indication device is as follows: receiving a position adjustment signal sent by the user using a wireless air mouse, where the position adjustment signal sent using the wireless air mouse is sent by the user by operating a direction key, and a position locating device may receive, using a wireless signal receiver, the position adjustment signal sent using the wireless air mouse, accordingly adjust the screen position of the line of sight, and display a position indicated by the user on the screen; or receiving a position adjustment signal sent by the user using a touchscreen indication device, where the position adjustment signal sent using the touchscreen indication device is sent by the user by sliding a corresponding distance in a corresponding direction on a touchscreen, and a position locating device may receive, using a wireless signal receiver, the position adjustment signal sent using the touchscreen indication device, accordingly adjust the screen position of the line of sight, and display a position indicated by the user on the screen; or receiving a position adjustment signal sent by the user using a 3D handle/mouse, where the position adjustment signal sent using the 3D handle/mouse is detected by a built-in sensor of a handle/mouse device or an external detection device when the user moves or rotates the handle/mouse device, for example, a movement distance and a rotation angle; and a position locating device may receive, using a wireless signal receiver, the position adjustment signal sent using the 3D handle/mouse, accordingly adjust the screen position of the line of sight, and display a position indicated by the user on the screen.

In another manner, the adjustment signal is received, an offset obtained according to a wrist position and a finger deviation angle of the user is detected, and the position displayed on the screen is adjusted according to the offset.

The offset, on the screen, of the screen position of the line of sight is obtained by detecting a hand deviation angle of the user. For example, a fourth coordinate system is established, and the screen is a plane formed by an X axis and a Y axis. Finger coordinates and wrist coordinates $(x_s, y_s, z_s)$ of the user are located using a camera (which is not limited to the camera herein, and methods such as target detection based on ultrasound, target detection based on an electric field, or electromyographic signal detection based on a wearable armband may be used) method. A first pointing direction (including an angle $\alpha_1$ between the pointing direction and a horizontal plane, an angle $\beta_1$ between the pointing direction and a side plane, and an angle $\gamma_1$ between the pointing direction and a vertical plane) is calculated according to a line between the finger coordinates and the wrist coordinates. When a finger of the person deflects, the coordinates of the finger are located again; a second pointing direction (including an angle $\alpha_2$ between the pointing direction and the horizontal plane, an angle $\beta_2$ between the pointing direction and the side plane, and an angle $\gamma_2$ between the pointing direction and the vertical plane) is calculated according to a line between new finger coordinates and the wrist coordinates; an angle difference $(\alpha_2-\alpha_1, \beta_2-\beta_1, \gamma_2-\gamma_1)$ between the two directions is obtained; and displacement, in a horizontal direction and a vertical direction, of the screen position of the line of sight is calculated, and formulas are as follows:

$dx = x_s + z_s \cdot \tan(\alpha_2 - \alpha_1)$; and $dy = y_s + z_s \cdot \tan(\beta_2 - \beta_1)$, where dx is displacement, in the horizontal direction on the screen, of the screen position of the line of sight, and dy is displacement, in the vertical direction on the screen, of the screen position of the line of sight. A position indicated by the user is obtained by displacing the screen position of the line of sight, and the position indicated by the user is displayed on the screen. Optionally, if the angle difference $(\alpha_2-\alpha_1, \beta_2-\beta_1, \gamma_2-\gamma_1)$ between the two directions exceeds a preset deflection angle, a current user operation may be invalidated, and the second pointing direction is obtained again.

Certainly, for detecting and receiving the position adjustment signal sent by the user, the present disclosure is not limited to the foregoing methods. Any solution in which the position adjustment signal of the user is detected using a wireless device or a camera (for example, a common RGB (which has pixels of three primary colors: red, green, and blue) camera, a depth camera, or a 3D camera) and the screen position of the line of sight is accordingly adjusted falls within the protection scope of the embodiments of the present disclosure.

Further, the position locating apparatus 600 further includes a determining unit 605 configured to, when the adjustment unit receives the adjustment signal, obtain an indication signal, and determine, according to the indication signal, whether to update the screen position of the line of sight.

Optionally, the determining unit includes an obtaining subunit 605-1 and a determining subunit 605-2, where the obtaining subunit 605-1 is configured to obtain a time between a moment of receiving the adjustment signal and a moment of receiving a previous adjustment signal; and the determining subunit 605-2 is configured to determine whether the time exceeds a preset time, and if the time exceeds the preset time, update the screen position of the line of sight; or the obtaining subunit 605-1 is configured to receive an audio signal; and the determining subunit 605-2 is configured to determine whether the audio signal is consistent with to-be-triggered sound, and if the audio signal is consistent with the to-be-triggered sound, update the screen position of the line of sight; or the obtaining subunit 605-1 is configured to receive an action signal; and the determining subunit 605-2 is configured to determine whether the action signal is consistent with a to-be-triggered action, and if the action signal is consistent with the to-be-triggered action, update the screen position of the line of sight.

Further, the adjustment unit 604 is further configured to, if the determining unit 605 determines not to update the screen position of the line of sight, adjust the position on the screen according to the adjustment signal.

Further, the display unit 603 is further configured to, if the screen position of the line of sight is to be updated, display, on the screen, an updated screen position of the line of sight.

In this case, after a new screen position of the line of sight is obtained, when an adjustment signal is received again, the determining unit 605 determines whether the screen position of the line of sight needs to be updated, and cyclically performs the foregoing process.

In the foregoing solutions, using the position locating apparatus, a line-of-sight orientation parameter of a user is obtained, a line-of-sight source position of the user is obtained, and a position of a screen is obtained; a screen position of a line of sight is obtained according to the line-of-sight orientation parameter, the position of the screen, and the line-of-sight source position; the screen position of the line of sight is displayed on the screen; and an adjustment signal is received, the position displayed on the screen is adjusted according to the adjustment signal, and an adjusted position is displayed on the screen. In this way, the user can complete locating only by adjusting the position displayed on the screen, which simplifies a user operation and improves position locating efficiency.

Figure 8:
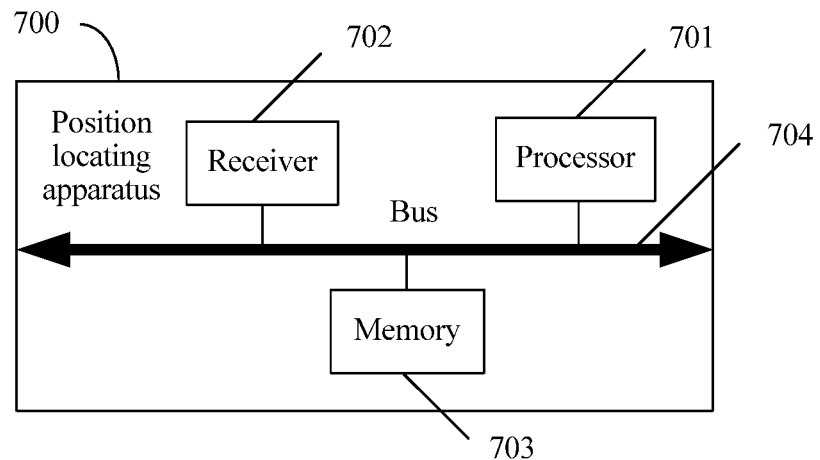
FIG. 8 is a schematic structural diagram of a position locating apparatus according to still another embodiment of the present disclosure.

An embodiment of the present disclosure provides a position locating apparatus 700 configured to receive an indication sent by a user, and display a corresponding position on a screen. As shown in FIG. 8, the apparatus 700 includes a processor 701, a receiver 702, a memory 703, and a bus 704. The processor 701 and the receiver 702 are connected using the bus 704, and the memory 703 is configured to store data processed by the processor 701.

The bus 704 may be an Industry Standard Architecture (ISA) bus, a Peripheral Component Interconnect (PCI) bus, an Extended Industry Standard Architecture (EISA) bus, or the like. The bus 704 may be categorized into an address bus, a data bus, a control bus, and the like. For ease of denotation, only one bold line is used in FIG. 8 for representation, but it does not mean that there is only one bus or only one type of bus.

The memory 703 is configured to store executable program code, where the program code includes a computer operation instruction. The memory 703 may include a high-speed random access memory (RAM) memory, and may further include a non-volatile memory, for example, at least one disk memory.

The processor 701 may be a central processing unit (CPU), or an application specific integrated circuit (ASIC), or one or more integrated circuits configured to implement the embodiments of the present disclosure.

The processor 701 is configured to detect a line-of-sight orientation of a user, and obtain a line-of-sight orientation parameter of the user.

The processor 701 may receive, using the receiver 702, a line of sight of the user detected using a line of sightsensor, and analyze an orientation of the line of sight, to obtain the corresponding line-of-sight orientation parameter, which is described in detail in step 101. Details are not described herein again.

The processor 701 is further configured to detect a line-of-sight source of the user, and obtain a line-of-sight source position of the user.

The processor 701 may perform locating using a depth camera method, a multiple-camera face method, or a method for locating, a multiple-camera face method, or an orientation locating method based on a head identifier. For example, eyes of a person are located using a face picture photographed by a depth camera, to determine the line-of-sight source position.

The processor 701 is configured to obtain a position of a screen, and obtain a screen position of a line of sight according to the obtained line-of-sight orientation parameter, the position of the screen, and the obtained line-of-sight source position.

A method for obtaining the screen position of the line of sight is described in step 103, and details are not described herein again.

The processor 701 is further configured to display, on the screen, the screen position of the line of sight.

The processor 701 is further configured to receive an adjustment signal using the receiver 702, adjust, according to the adjustment signal, the position displayed on the screen, and display an adjusted position on the screen.

After the user views the screen position, displayed on the screen, of the line of sight, because the screen position of the line of sight is a position to which the line of sight points, a deviation may exist between the screen position of the line of sight and a position to which the user wants to point, and the user needs to perform adjustment.

In one manner, an adjustment signal sent using a wireless indication device is received, and the position displayed on the screen is adjusted according to the adjustment signal sent using the wireless indication device, where the adjustment signal sent using the wireless indication device is used to indicate a movement direction and a movement distance.

A manner of receiving the adjustment signal sent by the user using the wireless indication device is as follows: receiving a position adjustment signal sent by the user using a wireless air mouse, where the position adjustment signal sent using the wireless air mouse is sent by the user by operating a direction key, and a position locating device may receive, using a wireless signal receiver, the position adjustment signal sent using the wireless air mouse, accordingly adjust the screen position of the line of sight, and display a position indicated by the user on the screen; or receiving a position adjustment signal sent by the user using a touchscreen indication device, where the position adjustment signal sent using the touchscreen indication device is sent by the user by sliding a corresponding distance in a corresponding direction on a touchscreen, and a position locating device may receive, using a wireless signal receiver, the position adjustment signal sent using the touchscreen indication device, accordingly adjust the screen position of the line of sight, and display a position indicated by the user on the screen; or receiving a position adjustment signal sent by the user using a 3D handle/mouse, where the position adjustment signal sent using the 3D handle/mouse is detected by a built-in sensor of a handle/mouse device or an external detection device when the user moves or rotates the handle/mouse device, for example, a movement distance and a rotation angle; and a position locating device may receive, using a wireless signal receiver, the position adjustment signal sent using the 3D handle/mouse, accordingly adjust the screen position of the line of sight, and display a position indicated by the user on the screen.

In another manner, the adjustment signal is received, an offset obtained according to a wrist position and a finger deviation angle of the user is detected, and the position displayed on the screen is adjusted according to the offset.

The offset, on the screen, of the screen position of the line of sight is obtained by detecting a hand deviation angle of the user. For example, a fourth coordinate system is established, and the screen is a plane formed by an X axis and a Y axis. Finger coordinates and wrist coordinates $(x_s, y_s, z_s)$ of the user are located using a camera (which is not limited to the camera herein, and methods such as target detection based on ultrasound, target detection based on an electric field, or electromyographic signal detection based on a wearable armband may be used) method. A first pointing direction (including an angle $\alpha_1$ between the pointing direction and a horizontal plane, an angle $\beta_1$ between the pointing direction and a side plane, and an angle $\gamma_1$ between the pointing direction and a vertical plane) is calculated according to a line between the finger coordinates and the wrist coordinates. When a finger of the person deflects, the coordinates of the finger are located again; a second pointing direction (including an angle $\alpha_2$ between the pointing direction and the horizontal plane, an angle $\beta_2$ between the pointing direction and the side plane, and an angle $\gamma_2$ between the pointing direction and the vertical plane) is calculated according to a line between new finger coordinates and the wrist coordinates; an angle difference $(\alpha_2-\alpha_1, \beta_2-\beta_1, \gamma_2-\gamma_1)$ between the two directions is obtained; and displacement, in a horizontal direction and a vertical direction, of the screen position of the line of sight is calculated, and formulas are as follows:

$$dx = x_s + z_s \cdot \tan(\alpha_2 - \alpha_1); \text{ and}$$

$$dy = y_s + z_s \cdot \tan(\beta_2 - \beta_1),$$

where dx is displacement, in the horizontal direction on the screen, of the screen position of the line of sight, and dy is displacement, in the vertical direction on the screen, of the screen position of the line of sight. A position indicated by the user is obtained by displacing the screen position of the line of sight, and the position indicated by the user is displayed on the screen. Optionally, if the angle difference $(\alpha_2-\alpha_1, \beta_2-\beta_1, \gamma_2-\gamma_1)$ between the two directions exceeds a preset deflection angle, a current user operation may be invalidated, and the second pointing direction is obtained again.

Certainly, for detecting and receiving the position adjustment signal sent by the user, the present disclosure is not limited to the foregoing methods. Any solution in which the position adjustment signal of the user is detected using a wireless device or a camera (for example, a common RGB (which has pixels of three primary colors: red, green, and blue) camera, a depth camera, or a 3D camera) and the screen position of the line of sight is accordingly adjusted falls within the protection scope of the embodiments of the present disclosure.

Optionally, the processor 701 is further configured to, when the receiver 702 receives the adjustment signal, obtain an indication signal, and determine, according to the indication signal, whether to update the screen position of the line of sight.

The processor 701 is configured to obtain a time between a moment of receiving the adjustment signal and a moment of receiving a previous adjustment signal; and determine whether the time exceeds a preset time, and if the time exceeds the preset time, update the screen position of the line of sight; or receive an audio signal; and determine whether the audio signal is consistent with to-be-triggered sound, and if the audio signal is consistent with the to-be-triggered sound, update the screen position of the line of sight; or receive an action signal; and determine whether the action signal is consistent with a to-be-triggered action, and if the action signal is consistent with the to-be-triggered action, update the screen position of the line of sight.

Further, the processor 701 is further configured to, if the screen position of the line of sight does not need to be updated, adjust the position on the screen according to the adjustment signal.

Further, the processor 701 is further configured to, if the screen position of the line of sight is to be updated, display, on the screen, an updated screen position of the line of sight.

In this case, after a new screen position of the line of sight is obtained, when an adjustment signal is received again, the processor 701 determines whether the screen position of the line of sight needs to be updated, and cyclically performs the foregoing process.

In the foregoing solutions, using the position locating apparatus, a line-of-sight orientation parameter of a user is obtained, a line-of-sight source position of the user is obtained, and a position of a screen is obtained; a screen position of a line of sight is obtained according to the line-of-sight orientation parameter, the position of the screen, and the line-of-sight source position; the screen position of the line of sight is displayed on the screen; and an adjustment signal is received, the position displayed on the screen is adjusted according to the adjustment signal, and an adjusted position is displayed on the screen. In this way, the user can complete locating only by adjusting the position displayed on the screen, which simplifies a user operation and improves position locating efficiency.

The foregoing descriptions are merely embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A position locating method, comprising:
    obtaining a line-of-sight orientation parameter of a user, wherein the line-of-sight orientation parameter corresponds to a line-of-sight orientation of the user;
    obtaining a line-of-sight source position of the user, the line-of-sight source position corresponding to a line-of-sight source of the user;
    obtaining a position of a screen, and obtaining a screen position of a line of sight according to the line-of-sight orientation parameter, the position of the screen, and the line-of-sight source position;
    displaying, on the screen, the screen position of the line of sight;
    receiving an adjustment signal;
    detecting an offset obtained according to a wrist position and a finger deviation angle of the user in response to receiving the adjustment signal by:
        detecting a first set of finger coordinates and a first set of wrist coordinates;
        calculating a first pointing direction according to a line between the first set of finger coordinates and the first set of wrist coordinates;
        detecting, after a finger deflection, a second set of finger coordinates and a second set of wrist coordinates;
        calculating a second pointing direction according to a line between the second set of finger coordinates and the second set of wrist coordinates; and
        determining the offset according to an angle difference between the second pointing direction and the first pointing direction;
    adjusting, according to the offset, the screen position of the line of sight displayed on the screen; and
    displaying an adjusted position of the line of sight on the screen.

2. The method according to claim 1, further comprising:
    obtaining an indication signal, and determining, according to the indication signal, whether to update the screen position of the line of sight; and
    displaying, on the screen, an updated screen position of the line of sight when the screen position of the line of sight is to be updated.

3. The method according to claim 1, further comprising:
    obtaining an indication signal, and determining, according to the indication signal, whether to update the screen position of the line of sight; and
    adjusting the position on the screen according to the adjustment signal when the screen position of the line of sight is not to be updated.

4. The method according to claim 2, wherein obtaining the indication signal, and determining, according to the indication signal, whether to update the screen position of the line of sight comprises:
    obtaining a time between a moment of receiving the adjustment signal and a moment of receiving a previous adjustment signal;
    determining whether the time exceeds a preset time; and
    updating the screen position of the line of sight when the time exceeds the preset time.

5. The method according to claim 2, wherein obtaining the indication signal, and determining, according to the indication signal, whether to update the screen position of the line of sight comprises:
    receiving an audio signal;
    determining whether the audio signal is consistent with to-be-triggered sound; and
    updating the screen position of the line of sight when the audio signal is consistent with the to-be-triggered sound.

6. The method according to claim 2, wherein obtaining the indication signal, and determining, according to the indication signal, whether to update the screen position of the line of sight comprises:
    receiving an action signal;
    determining whether the action signal is consistent with a to-be-triggered action; and
    updating the screen position of the line of sight when the action signal is consistent with the to-be-triggered action.

7. A position locating apparatus, comprising:
    a memory storing executable instructions;
    a processor coupled to the memory and configured to:
        obtain a line-of-sight orientation parameter of a user, the line-of-sight orientation parameter corresponding to a line-of-sight orientation of the user;
        obtain a line-of-sight source position of the user, the line-of-sight source position corresponding to a line-of-sight source of the user;
        obtain a position of a screen; and obtain a screen position of a line of sight according to the line-of-sight orientation parameter, the position of the screen, and the line-of-sight source position; and a display coupled to the processor and configured to display, on the screen, the screen position of the line of sight, and wherein the processor is further configured to:

receive an adjustment signal;

detect an offset obtained according to a wrist position and a finger deviation angle of the user in response to receiving the adjustment signal by:

detecting a first set of finger coordinates and a first set of wrist coordinates;

calculating a first pointing direction according to a line between the first set of finger coordinates and the first set of wrist coordinates;

detecting, after a finger deflection, a second set of finger coordinates and a second set of wrist coordinates;

calculating a second pointing direction according to a line between the second set of finger coordinates and the second set of wrist coordinates; and determining the offset according to an angle difference between the second pointing direction and the first pointing direction;

adjust, according to the offset, the screen position of the line of sight displayed on the screen; and display an adjusted position of the line of sight on the screen.

8. The apparatus according to claim 7, wherein the processor is further configured to obtain an indication signal, and determine, according to the indication signal, whether to update the screen position of the line of sight, wherein the display is further configured to display, on the screen, an updated screen position of the line of sight when the screen position of the line of sight is to be updated.

9. The apparatus according to claim 7, wherein the processor is further configured to:

obtain an indication signal, and determine, according to the indication signal, whether to update the screen position of the line of sight; and adjust the position on the screen according to the adjustment signal when the screen position of the line of sight is not to be updated.

10. The apparatus according to claim 8, wherein the processor is further configured to:

obtain a time between a moment of receiving the adjustment signal and a moment of receiving a previous adjustment signal; and determine whether the time exceeds a preset time, and update the screen position of the line of sight when the time exceeds the preset time.

11. The apparatus according to claim 8, wherein the processor is further configured to:

receive an audio signal;

determine whether the audio signal is consistent with to-be-triggered sound; and update the screen position of the line of sight when the audio signal is consistent with the to-be-triggered sound.

12. The apparatus according to claim 8, wherein the processor is further configured to:

receive an action signal;

determine whether the action signal is consistent with a to-be-triggered action; and update the screen position of the line of sight when the action signal is consistent with the to-be-triggered action.

* * * * *